(12) United States Patent
Kawakami et al.

(10) Patent No.: US 7,851,103 B2
(45) Date of Patent: Dec. 14, 2010

(54) SOLID OXIDE FUEL CELL WITH LANTHANUM-GALLATE OXIDE AND HAVING HIGH OUTPUT PERFORMANCE

(75) Inventors: Akira Kawakami, Fukuoka (JP); Satoshi Matsuoka, Fukuoka (JP); Naoki Watanabe, Fukuoka (JP)

(73) Assignee: Toto Ltd., Fukuoka (JP)

( * ) Notice: Subject to any disclaimer, the term of this patent is extended or adjusted under 35 U.S.C. 154(b) by 1019 days.

(21) Appl. No.: 11/588,103

(22) Filed: Oct. 26, 2006

(65) Prior Publication Data

US 2008/0102340 A1 May 1, 2008

(51) Int. Cl.
*H01M 8/12* (2006.01)
(52) U.S. Cl. .................. 429/489; 429/479; 429/486
(58) Field of Classification Search .......... 429/479, 429/484, 486
See application file for complete search history.

(56) References Cited

U.S. PATENT DOCUMENTS 6,893,762 B2 * 5/2005 Sarkar et al. ............... 429/31

FOREIGN PATENT DOCUMENTS

| JP | 11-335164 | 12/1999 |
| JP | 2002-015756 | 1/2002 |
| JP | 2003-173802 | 6/2003 |

OTHER PUBLICATIONS

Gong, Wenquan, et al.. "Materials Systems for Intermediate-Temperature (600-800° C.) SOFCs Based on Doped Lanthanum-Gallate Electrolyte." Journal of the Electrochemical Society, 152 (9) A1890-A1895 (2005).*
Bi, Zhonghe; Wang, Z.; Dong, Y.; Wu, H.; She, Y.; Cheng, M., A High-Performance Anode-Supported SOFC with LDC-LSGM Bilayer Electrolytes, Electrochemical and Solid-State Letters, 7 (5) A105-A107 (2004), Dalian Institute of Chemical Physics, Chinese Academy of Sciences, Dalian 116023, China.

\* cited by examiner

*Primary Examiner*—Dah-Wei D Yuan
*Assistant Examiner*—Zachary Best
(74) *Attorney, Agent, or Firm*—Carrier Blackman & Associates, P.C.; Joseph P. Carrier; William D. Blackman

(57) ABSTRACT

A solid oxide fuel cell which has high output capacity especially at an operating temperature of 600° C.-800° C. and effectively prevents influence of reaction between respective layers. The solid oxide fuel cell includes a solid electrolyte layer between a fuel electrode and an air electrode, a support comprised of either the fuel electrode or the air electrode, and at least first and second layers provided in turn from the side of the support. The first layer is comprised of a cerium-containing oxide and the second layer is comprised of a lanthanum-gallate oxide containing at least lanthanum and gallate. A sintering assistant for improving sintering property of the cerium-containing oxide is contained in the first layer. When the thickness of the second layer is T μm, the value of T is 2<T<70.

17 Claims, 2 Drawing Sheets

SOLID OXIDE FUEL CELL WITH LANTHANUM-GALLATE OXIDE AND HAVING HIGH OUTPUT PERFORMANCE

BACKGROUND OF THE INVENTION

1. Field of the Invention

The present invention relates to a solid oxide fuel cell which has high output performance in the operating temperature of from 600° C. to 800° C. by effectively preventing influence of reaction between respective layers in solid oxide fuel cells of electrode supporting type having a lanthanum-gallate oxide in a solid electrolyte layer.

2. Description of the Related Art

Recently, with a view to lowering the operating temperature of the solid oxide fuel cell to 600° C. to 800° C., research on a low temperature operating type solid oxide fuel cell is energetically carried out. A lanthanum-gallate oxide is proposed as the low temperature operating solid oxide fuel cell (for example, see patent reference 1 and patent reference 2). However, the lanthanum-gallate oxide has high reactivity to another material so as to react to an air electrode or a fuel electrode thereby forming a reaction generating phase of high resistance, so that power generating capacity may be decreased. Especially, in the case of the solid oxide fuel cell of electrode supporting type in which the air electrode or the fuel electrode functions as a support and a solid electrolyte layer is formed as thin as possible, it is required to be sintered at a certain degree of high temperature in order for forming a gas-tight solid electrolyte layer. Therefore, there are such disadvantages that the reaction generating phase of high resistance is formed on the interface between the support and the solid electrolyte layer and that metallic components contained in the support diffuse into the solid electrolyte layer so as to reduce an oxygen ionic transference number to short-circuit between the fuel electrode and the air electrode, thus resulting in substantial decrease of the electric power generating capacity.

In view of these disadvantages, in relation to the solid oxide fuel cell in which the fuel electrode serves as the support, there is proposed the art to form a layer comprising $La_{0.45}Ce_{0.55}O_2$ as a reaction control layer between the fuel electrode and the solid electrolyte layer of the lanthanum-gallate oxide (for example, see non-patent reference 1). However, $La_{0.45}Ce_{0.55}O_2$ is a material of extremely low sintering property, so that it is difficult to densify the reaction control layer. As a result, the solid electrolyte layer comprised of the fuel electrode and the lanthanum-gallate oxide reacts through pores of the reaction control layer whereby the reaction phase of high resistance is formed on the interface. On the other hand, in order to prevent the short-circuit between the electrodes based on diffusion of the metallic components contained in the support, it is required to thicken the solid electrolyte layer comprised of the lanthanum-gallate oxide, thus incurring increase in resistance loss of the solid electrolyte layer so as to decrease the electric power generating capacity.

Further, when a cell is produced at such a high temperature (for example, about 1,600° C.) that the reaction control layer is formed in fully densified state, even if the reaction control layer is provided, the metallic components or the like contained in the support and the lanthanum-gallate oxide are subject to reaction to each other through a gaseous phase, while it is difficult to secure porosity of the support, so that the high power generating capacity may not be obtained.

On the other hand, in relation to the solid oxide fuel cell in which the fuel electrode serves as the support, there is proposed the art to form a layer comprising a cerium-containing oxide represented by $Ce_{1-z}Ln_zO_2$ ($0.05 \leq z \leq 0.3$), whose porosity is not more than 25%, as the reaction control layer between the fuel electrode and the solid electrolyte layer (for example, see patent reference 3). However, when the solid electrolyte layer comprises the lanthanum-gallate oxide, the reactivity to the proposed cerium-containing oxide is elevated so as to have the reaction generating phase of high resistance represented, for example, by $SrLaGa_3O_7$ or the like formed on an interface between a lanthanum-gallate layer and the layer of the cerium-containing oxide, so that power generating capacity expected from the physical properties of material itself may not be obtained.

Patent reference 1: Japanese patent application publication No. 2002-15756 (Pages 1-9, FIGS. 1-9).

Patent reference 2: Japanese patent application publication No. 11-335164 (Pages 1-12, FIGS. 1-12).

Patent reference 3: Japanese patent application publication No. 2003-173802 (Pages 1-7, Table 1).

Non-patent reference 1: Electrochemical and Solid-State Letters, 7(5) A105-A107(2004)

SUMMARY OF THE INVENTION

To solve the above mentioned disadvantages, the object of the present invention is to provide a solid oxide fuel cell which has excellent power generating capacity especially in the operating temperature of from 600° C. to 800° C. in relation to solid oxide fuel cells having a lanthanum-gallate oxide in a solid electrolyte layer.

To achieve the above mentioned object, in accordance with the present invention, a solid oxide fuel cell comprises a solid electrolyte layer between a fuel electrode and an air electrode, one of the fuel electrode and the air electrode functioning as a support, the solid electrolyte layer provided at least with a first layer and a second layer from the side of the support, the first layer comprising a cerium-containing oxide represented by a general formula $Ce_{1-x}Ln_xO_2$ in which Ln is either one or more kinds of La, Pr, Nd, Sm, Eu, Gd, Tb, Dy, Ho, Er, Tm, Yb, Lu, Sc and Y and the value of x is $0.30 < x < 0.50$, and the second layer comprising a lanthanum-gallate oxide containing at least lanthanum and gallium, wherein the first layer contains a sintering assistant for improving sintering property, and wherein when the thickness of the second layer is T μm, the value of T is $2 < T < 70$.

According to the present invention, the solid electrolyte layer is provided at least with the first layer and the second layer from the side of the support. The first layer comprises the cerium-containing oxide in which doped value of Ln is optimized, while the second layer comprises a lanthanum-gallate oxide containing at least lanthanum and gallium, wherein the first layer contains the sintering assistant for improving sintering property, and wherein when thickness of the second layer is T μm, the value of T is $2 < T < 70$. With this structure, it is possible to provide the solid oxide fuel cell which is excellent in power generating capacity. The reason is that as the first layer of cerium-containing oxide which contains the sintering assistant is provided between the support and the second layer of lanthanum-gallate oxide, the first layer is densified so as to effectively restrain the reaction between the support and the second layer of lanthanum-gallate oxide and the diffusion of metallic components from the support to the second layer. Also, by having the first layer densified, the resistance loss in the first layer is reduced. Further, as the composition of the cerium-containing oxide in the first layer is optimized, the reaction between the first layer and the second layer is restrained so as to improve the electric power generating capacity. Furthermore, as the thickness of the second layer is thinned in the above-defined range, the resistance loss in the first layer is reduced, so that the electric power generating capacity may be improved. Then, the densification of the first layer effectively restrains the diffusion of the metallic components from the support to the second layer, so that, even if the second layer is thinned, the short-circuit between the electrodes is prevented so as not to decrease the electric power generating capacity. Herein, if the thickness of the second layer becomes less than 2 μm, electronic conductivity is developed by having the first layer of cerium-containing oxide deoxidized under the fuel atmosphere, whereby the electric power generating capacity may be decreased.

In a preferred embodiment of the present invention, when the thickness of the second layer in the solid electrolyte layer is T μm, the value of T is $10 \leq T \leq 50$. Thus, the thickness of the second layer is not less than 10 μm so as to prevent more reliably the deoxidization of the first layer under the fuel atmosphere. Also, the thickness of the second layer is not more than 50 μm so as to reduce the resistance loss in the solid electrolyte layer.

In a preferred embodiment of the present invention, no intervening member is provided between the first layer and the second layer in the solid electrolyte layer. Thus, there is no intervening member of high resistance produced by reaction between the first layer and the second layer in the solid electrolyte layer, so that the resistance loss in the interface may be small so as to improve the electric power generating capacity.

In a preferred embodiment of the present invention, the sintering assistant contained in the first layer contains Ga element or B element. When adding the sintering assistant containing Ga element or B element to the cerium-containing oxide, the sintering property of the cerium-containing oxide of the first layer is improved thereby to densify the first layer. As the result, the reaction between the support and the second layer is effectively restrained and the resistance loss in the first layer is reduced, so that the electric power generating capacity is improved.

In a preferred embodiment of the present invention, when the content of the Ga element contained in the first layer is X wt %, the value of X is $0 < X \leq 5$. The reason why the content is defined in the above range, the first layer is more densified, and the influence on the electric conductivity by addition of the sintering assistant is next to nothing.

In a preferred embodiment of the present invention, when the content of the B element contained in the first layer is Y wt %, the value of Y is $0 < Y \leq 2$. The reason why the content is defined in the above range is that the influence on the electric conductivity by addition of the sintering assistant is next to nothing.

In a preferred embodiment of the present invention, when the thickness of the first layer is S μm, the value of S is $5 < S < 50$. Thus, the first layer is defined not less than 5 μm in thickness so as to prevent reaction between the fuel electrode and the second layer of lanthanum-gallate oxide, while the first layer is defined not more than 50 μm in thickness so as to diminish the influence due to resistance loss in the first layer.

In a preferred embodiment of the present invention, in the cerium-containing oxide in the first layer represented by the general formula $Ce_{1-x}Ln_xO_2$, Ln is La, and the value of x is $0.30 < x < 0.50$. Thus, the composition of the cerium-containing oxide is defined in the above range, so that the reaction between the first layer of cerium-containing oxide and the second layer of lanthanum-gallate oxide is most effectively restrained.

In a preferred embodiment of the present invention, the support comprises the fuel electrode, and the fuel electrode is comprised of a compound of uniform mixture between Ni and/or NiO and a zirconium-containing oxide doped with one or more kinds of CaO, $Y_2O_3$ and $Sc_2O_3$. As the zirconium-containing oxide is used as an oxygen ionic conductor contained in the fuel electrode support, the support is excellent in strength and high in stability.

In a preferred embodiment of the present invention, between the fuel electrode and the solid electrolyte layer there is provided a fuel electrode reaction catalyzing layer comprised of a uniform mixture between Ni and/or NiO and a cerium-containing oxide represented by $Ce_{1-y}Ln_yO_2$ in which Ln is one or more kinds of La, Pr, Nd, Sm, Eu, Gd, Tb, Dy, Ho, Er, Tm, Yb, Lu, Sc and Y, and the value of y is $0.05 \leq y \leq 0.50$, wherein the cerium-containing oxide contained in the fuel electrode reaction catalyzing layer is 10-90 parts by weight. The cerium-containing oxide has both high ionic conductivity and electronic conductivity under reduction atmosphere, so that a three-phase interface acting as a reaction field with respect to the following formula (1) and formula (2) is more increased so as to more effectively carry out reaction of formula (1) and formula (2) thereby to improve the electric power generating capacity. Herein, if the ratio of the cerium-containing oxide is off the above range, the fuel electrode reaction catalyzing layer produces almost no effect.

$$H_2 + O^{2-} \rightarrow H_2O + 2e^- \tag{1}$$

$$CO + O^{2-} \rightarrow CO_2 + 2e^- \tag{2}$$

In a preferred embodiment of the present invention, the second layer of lanthanum-gallate oxide comprises a lanthanum-gallate oxide represented by a general formula $La_{1-a}A_aGa_{1-b-c}X_bZ_cO_3$ in which A is one or more kinds of Sr, Ca and Ba, X is one or more kinds of Mg, Al and In, Z is one or more kinds of Co, Fe, Ni and Cu, the value of a is $0 < a < 1$, the value of b is $0 < b < 1$, and the value of c is $0 \leq c \leq 0.15$. The lanthanum-gallate oxide of the above range has high oxygen ionic conductivity, so that the resistance loss in the second layer is diminished thereby to improve the electric power generating capacity.

In a preferred embodiment of the present invention, the second layer of lanthanum-gallate oxide is represented by a general formula $La_{1-a}Sr_aGa_{1-b-c}Mg_bCo_cO_3$ in which the value of a is $0.05 \leq a \leq 0.3$, the value of b is $0 \leq b \leq 0.3$ and the value of c is $0 \leq c \leq 0.15$. The lanthanum-gallate oxide of the above range has very high oxygen ionic conductivity, so that the resistance loss in the second layer is diminished thereby to improve the electric power generating capacity.

As mentioned above, the solid oxide fuel cell of the present invention comprises the solid electrolyte layer between the fuel electrode and the air electrode, one of the fuel electrode and the air electrode functioning as the support, the solid electrolyte layer provided at least with the first layer and the second layer from the side of the support, the first layer comprising the cerium-containing oxide represented by the general formula $Ce_{1-x}Ln_xO_2$ in which Ln is one or more kinds of La, Pr, Nd, Sm, Eu, Gd, Tb, Dy, Ho, Er, Tm, Yb, Lu, Sc and Y and the value of x is $0.30 < x < 0.50$, and the second layer comprising a lanthanum-gallate oxide containing at least lanthanum and gallium, wherein the first layer contains a sintering assistant for improving sintering property, and wherein when the thickness of the second layer is T μm, the value of T is $2 < T < 70$. Therefore, it is possible to provide the solid oxide fuel cell which has high output capacity especially at the operating temperature of about 600° C.-800° C.

DETAILED DESCRIPTION OF THE PREFERRED EMBODIMENTS

Figure 1:
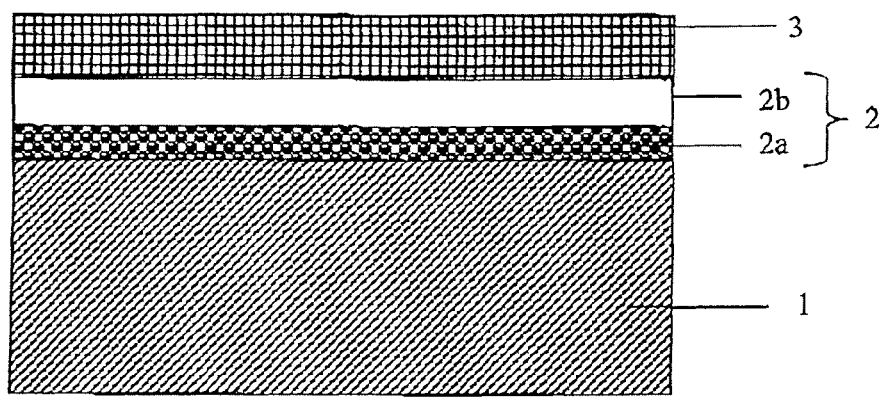
FIG. 1 is a sectional view showing a single cell in a solid oxide fuel cell of the present invention.

A solid oxide fuel cell of the present invention will now be explained. FIG. 1 is a sectional view showing one embodiment of a single cell in the solid oxide fuel cell according to the present invention, wherein a support is comprised of a fuel electrode. The solid oxide fuel cell of the present invention comprises, for example, a fuel electrode support 1 made, for example, of a compound between Ni and/or NiO and a zirconium-containing oxide doped with $Y_2O_3$, a first layer 2a of a solid electrolyte layer 2 being formed on a surface of the fuel electrode support 1 and made of a cerium-containing oxide represented, for example, by $Ce_{1-x}La_xO_2$ in which the value of x is $0.30<x<0.50$, a second layer 2b of the solid electrolyte layer 2 being made of a lanthanum-gallate oxide, and an air electrode 3 being formed on a surface of the solid electrolyte layer 2 and made, for example, of a lanthanide-cobalt oxide or a samarium-cobalt oxide.

An operating method of the solid oxide fuel cell shown in FIG. 1 is explained as an example hereunder. When air flows to the air electrode so as to flow fuel to the fuel electrode, atmospheric oxygen changes into oxygen ion in the vicinity of an interface between the air electrode and the solid electrolyte layer, and the oxygen ion passes through the solid electrolyte layer to reach the fuel electrode. Then, a fuel gas and the oxygen ion react and change into water and carbon dioxide. These reactions are represented by the following formulas (1), (2) and (3). It is possible to take electricity out by connecting between the air electrode and the fuel electrode with an external circuit.

$$H_2 + O^{2-} \rightarrow H_2O + 2e^- \quad (1)$$

$$CO + O^{2-} \rightarrow CO_2 + 2e^- \quad (2)$$

$$\tfrac{1}{2}O_2 + 2e^- \rightarrow O^{2-} \quad (3)$$

Incidentally, it is reported that $CH_4$ or the like contained in the fuel gas has reaction to produce electrons similar to formulas (1) and (2), but the explanation will be made herein by utilizing formulas (1) and (2), because it is possible to explain almost all of reaction with respect to electric power generation of the solid oxide fuel cell by formulas (1) and (2).

The cerium-containing oxide of the first layer in the solid electrolyte layer of the present invention has low reactivity with the second layer of the lanthanum-gallate oxide. From this viewpoint, one represented by a general formula $Ce_{1-x}Ln_xO_2$ in which Ln is La, and the value of x is $0.30<x<0.50$ is preferable. With this composition, the reaction with the solid electrolyte layer of the lanthanum-gallate oxide can be effectively prevented so as to improve an electric power generating capacity. Herein, an optimum doping value of Ln is changeable within the above range depending upon the composition of the lanthanum-gallate oxide used in the second layer. However, in view of the fact that the lanthanum-gallate oxide of high oxygen ionic conductivity represented for example by a general formula $La_{1-a}Sr_aGa_{1-b-c}Mg_bCo_cO_3$ in which the value of a is $0.05 \leqq a \leqq 0.3$, the value of b is $0 \leqq b \leqq 0.3$ and the value of c is $0 \leqq c \leqq 0.15$, is used in the second layer, it is preferable that the doping value of Ln is $0.35 \leqq x \leqq 0.45$. For example, if the composition of the lanthanum-gallate oxide is $La_{0.8}Sr_{0.2}Ga_{0.8}Mg_{0.2}O_3$, x=0.4 is preferable.

Herein, it is possible to confirm reactivity between the cerium-containing oxide and the lanthanum-gallate oxide by the following method. Namely, the confirmation is carried out by uniformly mixing powder of the cerium-containing oxide and powder of the lanthanum-gallate oxide, thereafter, heat-treating the mixture at 1400° C., for example, and analyzing a crystal phase by an X-ray diffraction method.

TABLE 1

| | Peak assigned to $LaGaO_3$ | Peak assigned to $CeO_2$ | Peak assigned to $SrLaGa_3O_7$ | Peak assigned to $LaSrGaO_4$ | Others |
|---|---|---|---|---|---|
| LSGM/LDC50 | ○ | ○ | x | Δ | x |
| LSGM/LDC40 | ○ | ○ | x | x | x |
| LSGM/LDC30 | ○ | ○ | Δ | x | x |
| LSGM/LDC20 | ○ | ○ | ○ | x | x |
| LSGM/LDC10 | ○ | ○ | ○ | x | x |
| LSGM/SDC20 | ○ | ○ | ○ | x | x |
| LSGM/SDC10 | ○ | ○ | ○ | x | x |
| LSGM/GDC20 | ○ | ○ | ○ | x | x |
| LSGM/GDC10 | ○ | ○ | ○ | x | x |

Shown in Table 1 are crystal phases identified by the X-ray diffraction method after heat-treating the mixture at 1400° C. which is obtained by uniformly mixing equivalent weights of the lanthanum-gallate oxide powder and each of the cerium-containing oxide powders. The composition of the lanthanum-gallate oxide used herein is $La_{0.8}Sr_{0.2}Ga_{0.8}Mg_{0.2}O_3$. As the composition of the cerium-containing oxide, nine kinds of oxides, such as $Ce_{0.5}La_{0.5}O_2$ (hereinafter, referred to as LDC50), $Ce_{0.6}La_{0.4}O_2$ (hereinafter, referred to as LDC40), $Ce_{0.7}La_{0.3}O_2$ (hereinafter, referred to as LDC30), $Ce_{0.8}La_{0.2}O_2$ (hereinafter, referred to as LDC20), $Ce_{0.9}La_{0.1}O_2$ (hereinafter, referred to as LDC10), $Ce_{0.8}Sm_{0.2}O_2$ (hereinafter, referred to as SDC20), $Ce_{0.9}Sm_{0.1}O_2$ (hereinafter, referred to as SDC10), $Ce_{0.8}Gd_{0.2}O_2$ (hereinafter, referred to as GDC20) and $Ce_{0.9}Gd_{0.1}O_2$ (hereinafter, referred to as GDC10) are used. In Table 1, "○" indicates that a peak is confirmed. "x" indicates that a peak is not confirmed at all. "Δ" indicates that a peak is confirmed but very small. From Table 1, it is possible to confirm that the cerium-containing oxides of the present invention which are doped with a large value of La have low reactivity with the lanthanum-gallate oxide. Reaction generating phases of $SrLaGa_3O_7$ and $LaSrGaO_4$ are electrically high resistance phases. Accordingly, when these reaction generating phases are developed between the first layer and the second layer of the solid electrolyte layer, the electric power generating capacity is lowered.

It is preferable that a sintering assistant of the present invention to be added to the cerium-containing oxide of the first layer in the solid electrolyte layer is capable of improving density of the first layer and is less affected by reaction with surrounding materials. The inventors carried out several studies of sintering assistants and found that Ga element and B element are effective. As Ga element, for example, gallium oxide ($Ga_2O_3$), gallium compound which becomes $Ga_2O_3$ during sintering process, etc. are preferable. As B element, for example, boric acid ($H_3BO_3$), boron nitride (BN), boron oxide ($B_2O_3$), boron compound which becomes $B_2O_3$ during sintering process, etc. are preferable.

In the present invention, when the content of the Ga element contained in the first layer is X wt % on an oxide basis, $0<X\leqq5$ is preferable. The reason why it is defined in the above range is that the first layer is more densified so as to effectively restrain reaction between the support and the second layer and to decrease resistance loss in the first layer. A more preferable range is $0.3<X<2.0$. With this range, in addition to the above mentioned effects, electric conductivity of the cerium-containing oxide itself is improved so as to decrease further the resistance loss in the first layer.

In the present invention, when the content of the B element contained in the first layer is Y wt % on an oxide basis, $0<Y\leqq2$ is preferable. By defining this range, resistance loss in the first layer is decreased. Herein, it is preferable that the content of B element is as small as possible within the above range.

In the present invention, when the thickness of the first layer made of the cerium-containing oxide is S μm, $5<S<50$ is preferable. $10\leqq S\leqq40$ is more preferable.

By defining the thickness of the first layer to be not less than 5 μm, the reaction between the support and the second layer of the lanthanum-gallate oxide is prevented, and if defining it to be not less than 10 μm, the reaction is more reliably prevented. On the other hand, by defining the thickness of the first layer to be not more than 50 μm, influence of resistance loss in the first layer is diminished, and if defining it to be not more than 40 μm, the influence of the resistance loss in the first layer is further diminished. Thus, it is preferable that the thickness of the first layer is as thin as possible within such range that the reaction between the support and the second layer of the lanthanum-gallate oxide can be fully prevented.

Preferably, the lanthanum-gallate oxide in the second layer of the solid electrolyte layer according to the present invention is represented by a general formula $La_{1-a}Sr_aGa_{1-b}Mg_bO_3$ wherein the value of a is $0.05\leqq a\leqq0.3$ and the value of b is $0\leqq b\leqq0.3$ (hereinafter, referred to as LSGM), because it has high oxygen ionic conductivity.

It is also preferable, in view of high oxygen ionic conductivity, that the lanthanum-gallate oxide in the second layer of the solid electrolyte layer according to the present invention is represented by a general formula $La_{1-a}Sr_aGa_{1-b-c}Mg_bCo_cO_3$ wherein the value of a is $0.05\leqq a\leqq0.3$, the value of b is $0\leqq b<0,3$ and the value of c is $0<c\leqq0.15$ (hereinafter, referred to as LSGMC).

The second layer of the solid electrolyte layer according to the present invention may be comprised of both a layer of LSGM and a layer of LSGMC. Namely, it may be multi-layer structure made of LSGM and LSGMC.

Further, the second layer of the lanthanum-gallate oxide according to the present invention may contain an additive agent such as a sintering assistant within such a range that it is not accompanied by a big decrease in oxygen ionic conductivity and no influence occurs by reaction with surrounding materials.

No limitation is placed on preparation methods of powder materials with respect to the cerium-containing oxide used for the first layer of the solid electrolyte layer and the lanthanum-gallate oxide used for the second layer according to the present invention. Generally, an oxide mixing method, a co-precipitation method, a citrate method, a spray thermal decomposition method, a sol-gel method, etc. are employed.

With respect to the fuel electrode according to the present invention, there is no limitation in particular, but it is preferable that the fuel electrode has high electronic conductivity under a fuel atmosphere of the solid oxide fuel cell and the reaction of the above formulas (1) and (2) is effectively carried out. From such viewpoint, preferred materials are for example NiO/zirconium-containing oxide, NiO/cerium-containing oxide, NiO/lanthanum-gallate oxide, etc. These NiO/zirconium-containing oxide, NiO/cerium-containing oxide and NiO/lanthanum-gallate oxide referred to herein each indicate materials which are uniformly mixed at predetermined ratios between NiO and zirconium-containing oxide, between NiO and cerium-containing oxide, and between NiO and lanthanum-gallate oxide. Also, the zirconium-containing oxide with respect to the NiO/zirconium-containing oxide referred to herein indicates zirconium-containing oxide which is doped for example with one or more kinds of CaO, $Y_2O_3$ and $Sc_2O_3$. The cerium-containing oxide with respect to the NiO/cerium-containing oxide referred to herein is represented by a general formula $Ce_{1-y}Ln_yO_2$ wherein La is one or more kinds of La, Pr, Nd, Sm, Eu, Gd, Tb, Dy, Ho, Er, Tm, Yb, Lu, Sc and Y and the value of y is $0.05\leqq y\leqq0.50$, and becomes a mixture conductor because it is reduced under the fuel atmosphere so as to develop electronic conductivity. Further, the lanthanum-gallate oxide with respect to the NiO/lanthanum-gallate oxide is not particularly limited but it is preferable to be LSGM or LSGMC in order for efficiently performing the reaction of the formulas (1) and (2). Also, because NiO is reduced under the fuel atmosphere so as to become Ni, the above mixtures become Ni/zirconium-containing oxide, Ni/cerium-containing oxide and Ni/lanthanum-gallate oxide, respectively.

The uniform mixture or one which is uniformly mixed described in this specification can be obtained by using the powder materials prepared by the oxide mixing method, the co-precipitation method, the citrate method, the spray thermal decomposition method, the sol-gel method, etc. Namely, such uniform mixture means that if the mixture has uniformity of the materials obtained through these methods, it is fully uniformed.

In the case where the support is comprised of the fuel electrode, NiO/zirconium-containing oxide is preferable because it is excellent in strength and has high stability. Also, in this case, it is preferable to provide a fuel electrode reaction catalyzing layer between the fuel electrode and the solid electrolyte layer with a view to performing the reaction of the above formulas (1) and (2) more efficiently and to improving the electric power generating capacity. As the fuel electrode reaction catalyzing layer according to the present invention, NiO/cerium-containing oxide, NiO/lanthanum-gallate oxide, etc. are selected because these are excellent in oxygen ionic conductivity as well as in electronic conductivity, and weight ratios of these oxides are preferably 10/90-90/10. The reason is that when NiO is less than 10/90, the electronic conductivity is too low, while when NiO is more than 90/10, the oxygen ionic conductivity is too low. Herein, the fuel electrode reaction catalyzing layer may be formed with such inclined structure that the value of NiO increases gradually from the solid electrolyte layer to the fuel electrode.

The fuel electrode and the fuel electrode reaction catalyzing layer according to the present invention may contain Fe, Co, Cu, Ru, Rh, Pd, Pt, etc. other than Ni.

As the air electrode of the present invention, not particularly limited but a lanthanum-manganese oxide, lanthanum-ferritic oxide, lanthanum-cobalt oxide, a lanthanum-nickel oxide, a samarium-cobalt oxide, etc, can be used.

In the case where the air electrode is used as the support, the lanthanum-manganese oxide is preferable in view of the fact that the material has stability and it is easy to secure pores when sintering the solid electrolyte layer. For example, when it is represented by a general formula $(La_{1-d}A_d)_e MnO_3$, it is preferable that the value of d is $0.15 \leq d \leq 0.3$, and the value of e is $0.97 \leq e \leq 1$. With respect to "A" in the general formula as represented herein, Ca or Sr is preferable. Also, into the lanthanum-manganese oxide, Ce, Sm, Gd, Pr, Nd, Co, Al, Fe, Cu, Ni, etc. may be dissolved. Further, in this case, with a view to more efficiently performing the reaction of formula (3) so as to improve the electric power generating capacity, it is preferable that an air electrode reaction catalyzing layer is provided between the air electrode and the solid electrolyte layer.

As the air electrode reaction catalyzing layer, in view of the fact that it is excellent in oxygen ionic conductivity as well as electronic conductivity, a uniform mixture for example between a lanthanum-ferritic oxide represented by a general formula $La_{1-m}Sr_m Co_{1-n}Fe_n O_3$ in which the value of m is $0.05 \leq m \leq 0.50$ and the value of n is $0 \leq n \leq 1$, and a cerium-containing oxide represented by $Ce_{1-y}Ln_y O_2$ in which Ln is one or more kinds of La, Pr, Nd, Sm, Eu, Gd, Tb, Dy, Ho, Er, Tm, Yb, Lu, Sc and Y, and the value of y is $0.05 \leq y \leq 0.50$, is preferable, wherein the cerium-containing oxide is preferably a mixture of 10-90 parts by weight.

The reason is that the lanthanum-ferritic oxide has high electronic conductivity and oxygen ionic conductivity, and, if uniformly mixed with the cerium-containing oxide represented by $Ce_{1-y}Ln_y O_2$ in which Ln is one or more kinds of La, Pr, Nd, Sm, Eu, Gd, Tb, Dy, Ho, Er, Tm, Yb, Lu, Sc and Y, and the value of y is $0.05 \leq y \leq 0.50$, a three-phase interface functioning as a reaction field of formula (3) is more increased so that the reaction of formula (3) is more efficiently performed and the electric power generating capacity is improved.

$$\tfrac{1}{2}O_2 + 2e^- \rightarrow O^{2-} \qquad (3)$$

Herein, if the ratio of the cerium-containing oxide contained in the air electrode reaction catalyzing layer is less than 10 parts by weight, sintering property of the air electrode reaction catalyzing layer is elevated so that the densification of microstructure of the air electrode reaction catalyzing layer is advanced when sintering the solid electrolyte layer and the fuel electrode, thereby to lower the electric power generating capacity. On the other hand, if it becomes more than 90 parts by weight, the air electrode reaction catalyzing layer produces almost no effect.

No limitation is placed on preparation methods of powder materials used for the fuel electrode and the air electrode according to the present invention. Generally, an oxide mixing method, a co-precipitation method, a citrate method, a spray thermal decomposition method, a sol-gel method, etc. are employed.

The solid electrolyte layer according to the present invention may be formed with such structure that at least a first layer, a second layer and a third layer are provided in turn from the side of the support. The third layer as referred to herein is comprised of a cerium-containing oxide represented by a general formula $Ce_{1-x}Ln_x O_2$ wherein Ln is one or more kinds of La, Pr, Nd, Sm, Eu, Gd, Tb, Dy, Ho, Er, Tm, Yb, Lu, Sc and Y, and the value of x is $0.30 < x < 0.50$. With provision of the third layer, the second layer of the lanthanum-gallate oxide can be restrained from reaction with both electrodes of the air electrode and the fuel electrode.

In the case of preparing the solid electrolyte fuel cell of the present invention by a sintering method, high output is required but there is no limitation to burning or baking method. Namely, either a sequential sintering method or a co-sintering method in which at least 2 or more kinds and preferably all kinds of components are sintered at a time may be employed. However, when considering mass productivity, the co-sintering method is preferable from the viewpoint of man-hour reduction.

When performing the co-sintering, preferably, a cell producing method comprises steps of preparing a molded body of a support of a fuel electrode or an air electrode and pre-sintering the same at 800° C.-1200° C., forming a solid electrolyte layer on a surface of thus obtained pre-sintered body, co-sintering the same together with the support at 1200° C.-1400° C., and forming another electrode on a surface of sintered solid electrolyte layer so as to sinter the same at 800° C.-1200° C. With respect to the sintering temperature at the time of co-sintering the support and the electrolyte layer it is more preferable to be 1250° C.-1350° C. from viewpoints of restraining diffusion of metallic components from the support and of obtaining the solid electrolyte layer having no gas permeability.

With respect to preparation method of the solid electrolyte layer of the present invention there is no particular limitation but a slurry coat method, a tape casting method, a doctor blade method, a screen printing method, an EVD method, a CVD method, an RF sputtering method, etc may be employed. In view of being excellent in mass production and low in cost, the slurry coat method is preferred.

There is no particular limitation with respect to a shape of the solid electrolyte fuel cell according to the present invention. A flat type and cylindrical type may be employed and the solid electrolyte fuel cell is applicable for example to a microtube type of not more than 10 mm and preferably not more than 5 mm. The solid electrolyte fuel cell of the present invention has an excellent electric power generating capacity especially at an operating temperature of about 600° C.-800° C. The low temperature operability of the solid electrolyte fuel cell is preferable from an aspect of starting performance of the solid electrolyte fuel cell. In view of reliability and stability with respect to quick starting and quick stopping, the preferred shape of the solid electrolyte fuel cell is the cylindrical type.

As the cerium-containing oxide and the lanthanum-gallate oxide described in the specification produce oxygen deficiency in relation to an amount and a kind of additional atom, they are represented, to be exact, by general formulas $Ce_{1-x}Ln_x O_{2-\delta}$ and $La_{1-a}A_a Ga_{1-b}X_b O_{3-\delta}$ wherein $\delta$ is the oxygen deficiency. However, it is difficult to measure the oxygen deficiency so that the cerium-containing oxide and the lanthanum-gallate oxide in this specification are represented by the general formulas $Ce_{1-x}Ln_x O_2$ and $La_{1-a}A_a Ga_{1-b}X_b O_3$ for the sake of convenience.

EXAMPLE (Study of Sintering Assistant by Bulk Body and Evaluation of Electric Conductivity)

With respect to the sintering assistant to be added to the cerium-containing oxide in the first layer of the solid electrolyte layer, a pressed body was prepared to carry out study. As the cerium-containing oxide, LDC40 powder was used. As the sintering assistant containing Ga element, $Ga_2 O_3$ powder was used and as the sintering assistant containing B element, $H_3 BO_3$ powder or BN powder was used and each of powders was mixed into the LDC40 powder to prepare a mixed powder such as to fall under the condition of Table 2 on an oxide conversion basis. Herein, the mixing was carried out by a ball mill. After having added a binder to the obtained mixed powder, uniaxial press forming was carried out so as to prepare the pressed body. The pressed body was sintered at a predetermined temperature indicated in Table 2. Relative density of the obtained sintering body was measured by an Archimedes method. After having grinded or polished the obtained sintering body to a thickness of 1 mm, a platinum paste was applied thereto and a platinum wire was fitted thereto and printed at 1000° C. With respect to the prepared sample, the electric conductivity of a pellet was measured by an alternating current impedance method.

As a comparative sample, a sintering body of LDC40 powder without addition of sintering assistant was prepared. Then, the relative density and the electric conductivity were measured in similar manners.

higher electric conductivity is obtained in comparison with the densified LDC40 (sample No. 25) without addition of sintering assistant. In the cases where the $H_3BO_3$ powders (sample Nos. 11-16) or the BN powders (sample Nos. 17-23) are added as the sintering assistant, when the B element content is Y wt % on the oxide conversion basis, it was confirmed that $0<Y \leqq 2$ is preferred in view of obtaining high electric conductivity.

(Preparation of Cell of Fuel Cell and Evaluation of Electric Generation)

In this example, a cylindrical solid oxide fuel cell each end of which is opened was prepared. A type of the fuel cell in which a fuel electrode functions as a support and another type of the fuel cell in which an air electrode functions as the support were prepared, respectively. The preparation method of the cylindrical solid oxide fuel cell will be explained in detail hereunder.

TABLE 2

| Sample No. | Sintering assistant | Adding ratio (wt %) of sintering assistant | Sintering condition | Relative density (%) | Electric conductivity (S/cm) | | |
|---|---|---|---|---|---|---|---|
| | | | | | 800° C. | 700° C. | 600° C. |
| 1 | $Ga_2O_3$ | 0.01 | 1400° C. | 95.8 | 0.038 | 0.013 | 0.003 |
| 2 | | 0.05 | 1400° C. | 99.8 | 0.040 | 0.014 | 0.003 |
| 3 | | 0.10 | 1400° C. | 99.7 | 0.041 | 0.014 | 0.003 |
| 4 | | 0.20 | 1400° C. | 99.6 | 0.041 | 0.014 | 0.003 |
| 5 | | 0.50 | 1400° C. | 99.0 | 0.072 | 0.025 | 0.006 |
| 6 | | 0.60 | 1400° C. | 99.4 | 0.059 | 0.020 | 0.005 |
| 7 | | 1.00 | 1400° C. | 97.2 | 0.054 | 0.018 | 0.005 |
| 8 | | 3.00 | 1400° C. | 95.8 | 0.037 | 0.013 | 0.003 |
| 9 | | 5.00 | 1400° C. | 95.6 | 0.038 | 0.013 | 0.003 |
| 10 | | 10.00 | 1400° C. | 90.2 | 0.030 | 0.012 | 0.002 |
| 11 | $H_3BO_3$ | 0.05 | 1400° C. | 99.8 | 0.035 | 0.014 | 0.003 |
| 12 | | 0.20 | 1400° C. | 99.6 | 0.030 | 0.013 | 0.003 |
| 13 | | 0.50 | 1400° C. | 99.7 | 0.041 | 0.016 | 0.004 |
| 14 | | 1.00 | 1400° C. | 99.5 | 0.040 | 0.013 | 0.004 |
| 15 | | 2.00 | 1400° C. | 99.3 | 0.030 | 0.010 | 0.002 |
| 16 | | 5.00 | 1400° C. | 99.2 | 0.022 | 0.010 | 0.002 |
| 17 | BN | 0.10 | 1400° C. | 99.8 | 0.030 | 0.013 | 0.003 |
| 18 | | 0.20 | 1400° C. | 99.6 | 0.030 | 0.013 | 0.003 |
| 19 | | 0.50 | 1400° C. | 99.6 | 0.047 | 0.016 | 0.003 |
| 20 | | 0.70 | 1400° C. | 99.6 | 0.040 | 0.014 | 0.003 |
| 21 | | 1.40 | 1400° C. | 99.9 | 0.030 | 0.010 | 0.002 |
| 22 | | 2.00 | 1400° C. | 99.2 | 0.030 | 0.010 | 0.002 |
| 23 | | 5.00 | 1400° C. | 99.5 | 0.024 | 0.010 | 0.002 |
| *24 | None | — | 1400° C. | 75.3 | 0.030 | 0.006 | 0.002 |
| *25 | | — | 1600° C. | 99.3 | 0.042 | 0.015 | 0.004 |

Note:
Mark * indicates comparative sample.

The relative density and the electric conductivity of each of sintered pellets are indicated in Table 2. By adding the sintering assistant containing the Ga element and the B element proposed in the present invention, sintering property was remarkably improved so that fully densified sintering body was able to be obtained at a level of 1400° C. There was no bad influence on the electric conductivity due to addition of the sintering assistant while it was confirmed that the electric conductivity is improved by the improvement in densification. In the case of adding the $Ga_2O_3$ as the sintering assistant (sample Nos. 1-10), when the Ga element content is X wt % on the oxide conversion basis, it was confirmed that $0<X \leqq 5$ is preferable because it is possible to obtain high density and electric conductivity. Further, it was confirmed that $0.3<X<2.0$ is more preferable because if sintered at 1600° C., Preparation of Cell with Fuel Electrode Functioning as Supporting Member.

Figure 2:
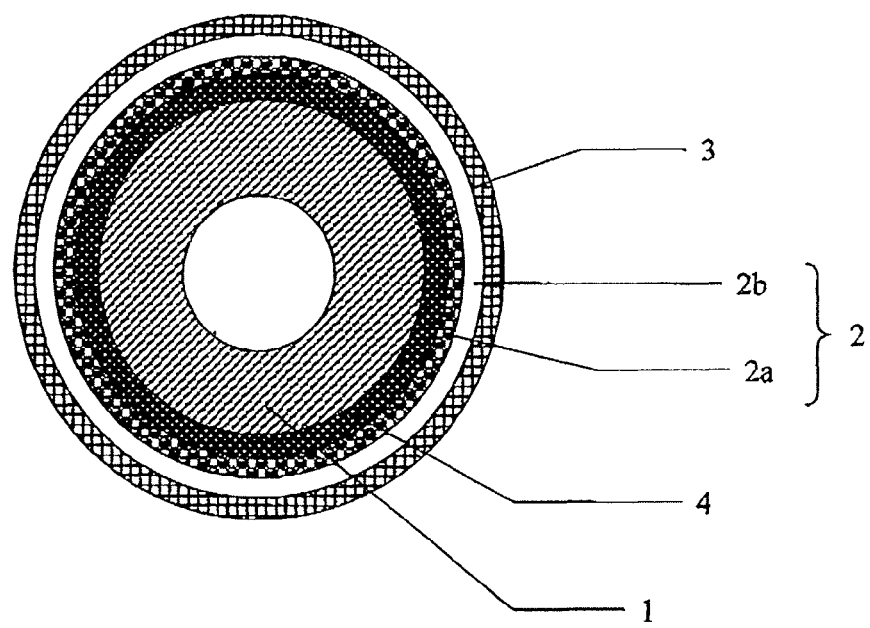
FIG. 2 is a sectional view of a solid oxide fuel cell in which a support comprises a fuel electrode produced by an example of the present invention.

The structure of the prepared solid oxide fuel cell with the fuel electrode functioning as the support is shown in FIG. 2. The fuel cell comprises a solid electrolyte layer 2 formed on an outer side of a fuel electrode support 1, an air electrode 3 formed on an outer side of the solid electrolyte layer 2, and a fuel electrode reaction catalyzing layer 4 provided between the fuel electrode support 1 and the solid electrolyte layer 2. The solid electrolyte layer 2 is comprised of a first layer 2a and a second layer 2b. The preparation steps will be explained hereunder.

After having prepared a compound mixture between NiO powder and $(ZrO_2)_{0.90}(Y_2O_3)_{0.10}$ powder (hereinafter, referred to as YSZ) by a wet blending method, heat-treatment and pulverization were carried out to produce a fuel electrode powder material. Mixing ratio between NiO powder and YSZ powder was set to be 65/35 by weight-percentage. The powder was processed by an extrusion molding method to prepare a cylindrical molded body. The molded body was heat-treated at 900° C. so as to produce a pre-sintering body. On a surface of the pre-sintering body, the fuel electrode reaction catalyzing layer, a first layer of a solid electrolyte layer and the second layer thereof were formed in turn by a slurry coat method. Thus formed layered body was co-sintered with a support at 1300° C. Herein, the thickness of the first layer of the solid electrolyte layer was so adjusted as to be such thickness as indicated in Table 3, respectively. Also, the thickness of the second layer of the solid electrolyte layer was so adjusted to be each of thicknesses as indicated in Table 3. Then, the cell was masked such that the area of the air electrode is 17.3 $cm^2$. On a surface of the solid electrolyte layer, an air electrode was formed by the slurry coat method and sintered at 1100° C. Incidentally, the fuel electrode support was set to be 5 mm in external diameter, 1 mm in thickness and 110 mm in effective cell length by measurements after co-sintering. A slurry preparation method of each layer used for the slurry coat method will be explained in detail from (1-a) to (1-d) hereunder.

(1-a) Preparation of Slurry of Fuel Electrode Reaction Catalyzing Layer

After having prepared mixture between the NiO powder and GDC10 powder by a co-precipitation method, heat-treatment was carried out to obtain a fuel electrode reaction layer powder. The mixing ratio between the NiO powder and the GDC10 powder was set to be 50/50 in percent by weight. Average particle diameter was adjusted to be 0.5 μm. After having mixed 40 parts by weight of the powder with 100 parts by weight of a solvent (ethanol), 2 parts by weight of a binder (ethyl cellulose), 1 part by weight of a dispersing agent (polyoxyethylene-alkyl-phosphate) and 1 part by weight of an antifoaming agent (sorbitan sesquioleate), the mixture was fully stirred so that the slurry was prepared.

(1-b) Preparation of Slurry of First Layer in Solid Electrolyte Layer

LDC40 powder was used as the material of the first layer. $Ga_2O_3$ was used as a sintering assistant. After having mixed a blended powder between 40 parts by weight of the LDC40 powder and the 0.2 part by weight of the $Ga_2O_3$ powder (0.5 wt % to the LDC40 powder) with 100 parts by weight of a solvent (ethanol), 2 parts by weight of a binder (ethyl cellulose), 1 part by weight of a dispersing agent (polyoxyethylene-alkyl-phosphate) and 1 part by weight of an antifoaming agent (sorbitan sesquioleate), the mixture was fully stirred so that the slurry was prepared.

(1-c) Preparation of Slurry of Second Layer in Solid Electrolyte Layer

LSGM powder composed of $La_{0.8}Sr_{0.2}Ga_{0.8}Mg_{0.2}O_3$ was used as the material of the second layer. 40 parts by weight of the LSGM powder was mixed with 100 parts by weight of a solvent (ethanol), 2 parts by weight of a binder (ethyl cellulose), 1 part by weight of a dispersing agent (polyoxyethylene-alkyl-phosphate) and 1 part by weight of an antifoaming agent (sorbitan sesquioleate), and thereafter the mixture was fully stirred so that the slurry was prepared.

(1-d) Preparation of Slurry of Air Electrode

Powder composed of $La_{0.6}Sr_{0.4}Co_{0.8}Fe_{0.2}O_3$ was used as the material of the air electrode. After having mixed 40 parts by weight of the powder with 100 parts by weight of a solvent (ethanol), 2 parts by weight of a binder (ethyl cellulose), 1 part by weight of a dispersing agent (polyoxyethylene-alkyl-phosphate) and 1 part by weight of an antifoaming agent (sorbitan sesquioleate), the mixture was fully stirred so that the slurry was prepared.

In accordance with the above-mentioned cell preparation method, such a type of cell that $H_3BO_3$ powder used as a sintering assistant to be added to the first layer of the solid electrolyte layer is added 0.5 wt % to LDC40 powder on the oxide conversion basis was similarly prepared.

Also, such a type of cell that BN powder used as a sintering assistant to be added to the first layer of the solid electrolyte layer is added 0.5 wt % to LDC40 powder on the oxide conversion basis was similarly prepared.

Further, as a comparative example, such a type of cell that no sintering assistant is added to the first layer of the solid electrolyte layer was similarly prepared.

Further, as a comparative example, such a type of cell that GDC10 is used as the cerium-containing oxide used for the first layer of the solid electrolyte layer was similarly prepared.

Further, as a comparative example, such a type of cell that LDC10 is used as the cerium-containing oxide used for the first layer of the solid electrolyte layer was also prepared.

2. Electric Power Generation Test of Fuel Electrode Support Cell

An electric power generation test was carried out by using the obtained fuel electrode support cell in which the effective area of the electrode is 17.3 $cm^2$. Collection on the fuel electrode side was carried out by applying a silver paste to an entire inside surface of the fuel electrode support and thereafter by baking a silver mesh thereon. Collection on the air electrode side was carried out by applying the silver paste, cutting the silver mesh into rectangular slices to be helically wound around and thereafter by baking the same. As conditions of the power generation, a fuel was a compound gas between $H_2$+3% $H_2O$ and $N_2$. The fuel utilization was set to be 10%. An oxidizing agent was air. A measuring temperature was 600° C. and a generated electric potential at current density of 0.125 $A/cm^2$ was measured.

TABLE 3

| Cell No. | First layer | First layer Sintering assistant | First layer Thickness (μm) | Second layer | Second layer Thickness (μm) | Generated electric potential (V) |
|---|---|---|---|---|---|---|
| *1 | LDC40 | $Ga_2O_3$ | 10 | LSGM | 1 | x |
| 2 | LDC40 | $Ga_2O_3$ | 10 | LSGM | 10 | 0.79 |
| 3 | LDC40 | $Ga_2O_3$ | 10 | LSGM | 30 | 0.78 |
| 4 | LDC40 | $Ga_2O_3$ | 10 | LSGM | 50 | 0.74 |
| *5 | LDC40 | $Ga_2O_3$ | 10 | LSGM | 90 | x |
| 6 | LDC40 | $Ga_2O_3$ | 30 | LSGM | 30 | 0.68 |

TABLE 3-continued

| Cell No. | First layer | First layer Sintering assistant | First layer Thickness (μm) | Second layer | Second layer Thickness (μm) | Generated electric potential (V) |
|---|---|---|---|---|---|---|
| 7 | LDC40 | $Ga_2O_3$ | 40 | LSGM | 30 | 0.62 |
| 8 | LDC40 | $Ga_2O_3$ | 50 | LSGM | 30 | 0.58 |
| 9 | LDC40 | $H_3BO_3$ | 10 | LSGM | 30 | 0.75 |
| 10 | LDC40 | BN | 10 | LSGM | 30 | 0.76 |
| *11 | LDC40 | None | 10 | LSGM | 30 | 0.56 |
| *12 | GDC10 | $Ga_2O_3$ | 10 | LSGM | 30 | x |
| *13 | LDC10 | $Ga_2O_3$ | 10 | LSGM | 30 | x |

Note:
Mark * indicates comparative sample.

In Table 3, there is shown the result obtained by the power generation test of the cell which has the fuel electrode support. Herein, "x" in Table 3 shows the case where the generated electric potential is not more than 0.5 V. With the structure proposed in the present invention, it was confirmed that excellent electric power generating capacity can be obtained. Namely, when comparing No. 3 cell with No. 11 cell, the densification of the first layer was improved by adding the sintering assistant to the first layer so as to restrain the reaction between the support and the second layer of lanthanum-gallate oxide so that the diffusion of metallic components from the support was able to be effectively prevented thereby to improve the electric power generating capacity. Also, when comparing No. 3 cell with No. 12 cell and No. 13 cell, it was confirmed that, as the composition of the cerium-containing oxide of the first layer comprises the composition of doping amount proposed in the present invention, the development of high resistance layer due to the reaction between the first layer and the second layer can be prevented so as to improve the electric power generating capacity. Further, the thickness is varied in Nos. 1-5 cells. When the thickness of the second layer is T μm wherein the value of T is $10 \leq T \leq 50$, the high electric power generating capacity was obtained. Further, with respect to Nos. 3, 6, 7 and 8 cells, the thickness of the first layer is varied. When the thickness of the first layer is S μm, it was confirmed that $5 < S < 50$ is preferred and $10 \leq S \leq 40$ is more preferred. Although in Nos. 9 and 10 cells, the sintering assistant containing the B element is used, it was confirmed that the high electric power generating capacity can be obtained as is the case where the sintering assistant containing the Ga element is used.

Preparation of Cell of Air Electrode Support

Figure 3:
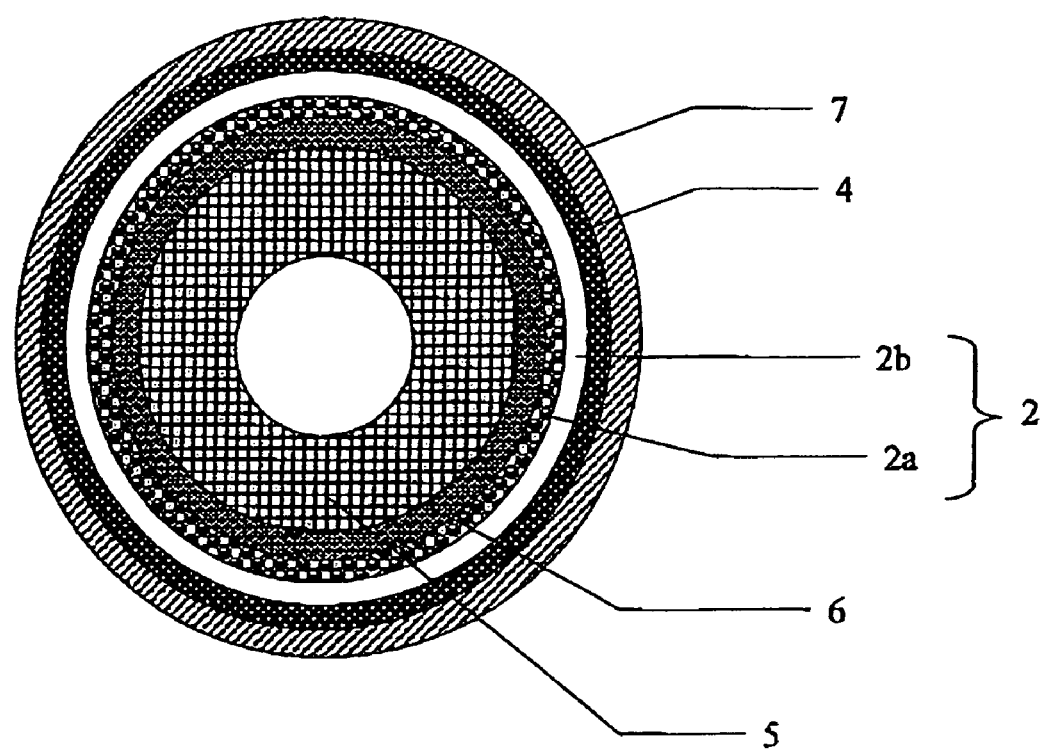
FIG. 3 is a sectional view of a solid oxide fuel cell in which a support comprises an air electrode produced by another example of the present invention.

The structure of the solid oxide fuel cell in which the support is comprised of the air electrode is shown in FIG. 3. Namely, the fuel cell comprises the solid electrolyte layer 2 formed on the outside of the air electrode support 5, the fuel electrode 7 formed on the outside of the solid electrolyte layer 2, and the air electrode reaction catalyzing layer provided between the air electrode support 5 and the solid electrolyte layer 2. Also, between the solid electrolyte layer 2 and the fuel electrode 7 is provided the fuel electrode reaction catalyzing layer 4. Herein, the solid electrolyte layer 2 is comprised of the first layer 2a and the second layer 2b. The preparation process will be explained hereunder.

(3-a) Preparation of Air Electrode Support

As material for the air electrode support, powder composed of $La_{0.75}Sr_{0.25}MnO_3$ was used and a cylindrical molded body was prepared by the extrusion molding method. Further, the baking was carried out at 1500° C. so as to produce the air electrode support. The air electrode support was set to be 5 mm in external diameter, 1 mm in thickness and 110 mm in effective cell length.

(3-b) Preparation of Air Electrode Support Layer

LSCF/GDC10 uniformly mixed between $La_{0.6}Sr_{0.4}Co_{0.2}Fe_{0.8}O_3$ powder (referred to as LSCF) and GDC10 powder was used as the material of the air electrode reaction catalyzing layer, wherein the LSCF and the GDC10 are 50/50 in weight percentage. In preparation process, after having prepared each of the LSCF and the GDC10, they were mixed in ethanol by using a zirconia ball, heat-treated and crushed by using again the zirconia ball so as to adjust diameters of particles. Then, the average particle diameter was set to be 5 μm. After having mixed 40 parts by weight of this air electrode reaction catalyzing powder with 100 parts by weight of a solvent (ethanol), 2 parts by weight of a binder (ethyl cellulose), 1 part by weight of a dispersing agent (polyoxyethylene-alkyl-phosphate) and 1 part by weight of an antifoaming agent (sorbitan sesquioleate), the mixture was fully stirred so that the slurry was prepared. By using this slurry, a film was formed on the air electrode support by the slurry coat method and sintered at 1400° C. The thickness of the air electrode reaction catalyzing layer was set to be 15 μm.

(3-c) Preparation of First Layer of Solid Electrolyte Layer

By using the slurry prepared in (1-b) above, a film was formed on the air electrode catalyzing layer by the slurry coat method and sintered at 1430° C. so that the first layer of the solid electrolyte layer was formed. The thickness of the first layer was set to be 10 μm (3-d) Preparation of Second Layer of Solid Electrolyte Layer By using the slurry prepared in (1-c) above, a film was formed on the first layer of the solid electrolyte layer by the slurry coat method and sintered at 1430° C. so that the second layer of the solid electrolyte layer was formed. The thickness of the second layer was set to be 30 μm (3-e) Preparation of Fuel Electrode Reaction Catalyzing Layer $NiO/Ce_{0.8}Sm_{0.2}O_2$ (hereinafter, referred to as Ni/SDC20) was used as the material of the fuel electrode catalyzing layer. The powdered material was obtained by preparing the material by the co-precipitation method, heat-treating the same, and controlling diameters of the particles. Two kinds of NiO/SDC20 such as 30/70 and 50/50 by weight percentage were prepared. In each kind, the average diameter of the particle was set to be 0.5 μm. 10 parts by weight of the powder was mixed with 500 parts by weight of a solvent (ethanol), 10 parts by weight of a binder (ethyl cellulose), 5 parts by weight of a dispersing agent (polyoxyethylene-alkyl-phosphate), 1 part by weight of an antifoaming agent (sorbitan sesquioleate) and 5 parts by weight of a plasticizer (DBP), and thereafter the mixture was fully stirred so that the slurry was prepared. The cell was masked such that the area of the fuel electrode is 17.3 cm². The film was formed in turn on NiO/SDC20=30/70 and NiO/SDC20=50/50. The thickness of the fuel electrode catalyzing layer after sintering was set to be 10 μm.

(3-f) Preparation of Fuel Electrode

NiO/SDC20 was used as a material and the powdered material was obtained by preparing the material by the co-precipitation method, heat-treating the same, and controlling diameters of the particles. The weight percentage of NiO/SDC20 was set to be 70/30. The particle diameter of the powder was set to be 1.5 μm. After having mixed 100 parts by weight of the powder with 500 parts by weight of a solvent (ethanol), 20 parts by weight of a binder (ethyl cellulose), 5 parts by weight of a dispersing agent (polyoxyethylene-alkyl-phosphate), 1 part by weight of an antifoaming agent (sorbitan sesquioleate) and 5 parts by weight of a plasticizer (DBP), the mixture was fully stirred so that the slurry was prepared. The film was formed on the fuel electrode reaction catalyzing layer. The thickness of the fuel electrode after sintering was set to be 90 μm. Then, the fuel electrode reaction catalyzing layer and the fuel electrode were sintered together at 1300° C.

In accordance with the above mentioned cell preparation method, as a comparative example, such a type of cell that no sintering assistant is added to the first layer of the solid electrolyte layer was similarly prepared.

Also, as a comparative example, such a type of cell that GDC10 is used as the cerium-containing oxide used for the first layer of the solid electrolyte layer was similarly prepared.

4. Electric Power Generation Test of Air Electrode Support Cell

An electric power generation test was carried out by using the obtained air electrode support cell in which the area of the electrode is 17.3 cm². Collection on the air electrode side was carried out by applying a silver paste to an entire inside surface of the air electrode support and thereafter by baking a silver mesh thereon. Collection on the fuel electrode side was carried out by applying Ni paste, cutting Ni mesh into rectangular slices and helically winding around. As conditions of the electric power generation, a fuel was a compound gas between $H_2+3\%$ $H_2O$ and $N_2$. The fuel utilization was set to be 10%. An oxidizing agent was air and the air utilization was set to be 20%. A measuring temperature was 600° C. and a generated electric potential at current density of 0.125 A/cm² was measured.

In table 4, there is shown the result obtained by the electric power generation test of the cell in which the air electrode functions as the support. It was confirmed that with the structure proposed in the present invention an excellent electric power generating capacity can be obtained.

Although there have been described what are the present embodiments of the invention, it will be understood by persons skilled in the art that variations and modifications may be made thereto within the spirit and scope of the invention as reflected by the appended claims.

What is claimed is:

1. A solid oxide fuel cell comprising a solid electrolyte layer between a fuel electrode and an air electrode, one of said fuel electrode and said air electrode functioning as a support, said solid electrolyte layer provided at least with a first layer and a second layer from the side of said support, said first layer comprising a cerium-containing oxide represented by a general formula $Ce_{1-x}Ln_xO_2$ in which Ln is one or more kinds of La, Pr, Nd, Sm, Eu, Gd, Tb, Dy, Ho, Er, Tm, Yb, Lu, Sc and Y and the value of x is 0.30<x<0.50, and said second layer comprising a lanthanum-gallate oxide containing at least lanthanum and gallium, wherein said first layer contains a sintering assistant for improving sintering property of said cerium-containing oxide, wherein when the thickness of said second layer is T μm, the value of T is 2<T<70, and wherein said sintering assistant contained in said first layer contains Ga element or B element.

2. The solid oxide fuel cell according to claim 1, wherein said first layer contains Ga element in an amount of X wt %, the value of X is 0<X≦5.

3. The solid oxide fuel cell according to claim 1, wherein said first layer contains B element in an amount of Y wt %, the value of Y is 0≦Y≦2.

4. The solid oxide fuel cell according to claim 1, wherein when the thickness of said first layer is S μm, the value of S is 5<S<50.

5. The solid oxide fuel cell according to claim 1, wherein in said cerium-containing oxide represented by the general formula $Ce_{1-x}Ln_xO_2$, Ln is La.

6. The solid oxide fuel cell according to claim 1, wherein said support comprises said fuel electrode, and said fuel electrode comprises a compound of uniform mixture between Ni and /or NiO and a zirconium-containing oxide doped with one or more kinds of CaO, $Y_2O_3$ and $Sc_2O_3$.

7. The solid oxide fuel cell according to claim 1, wherein between said fuel electrode and said solid electrolyte layer there is provided a fuel electrode reaction catalyzing layer comprising a uniform mixture between Ni and/or NiO and a cerium-containing oxide represented by $Ce_{1-y}Ln_yO_2$ in which Ln is one or more kinds of La, Pr, Nd, Sm, Eu, Gd, Tb, Dy, Ho, Er, Tm, Yb, Lu, Sc and Y, and the value of y is 0.05≦y≦0.50,

TABLE 4

| Cell No. | First layer | First layer Sintering assistant | First layer Thickness (μm) | Second layer | Second layer Thickness (μm) | Generated electric potential (V) |
| --- | --- | --- | --- | --- | --- | --- |
| 14 | LDC40 | $Ga_2O_3$ | 10 | LSGM | 30 | 0.64 |
| *15 | LDC40 | None | 10 | LSGM | 30 | 0.55 |
| *16 | GDC10 | $Ga_2O_3$ | 10 | LSGM | 30 | 0.46 |

Note:
Mark * indicates comparative sample.

and wherein said cerium-containing oxide contained in said fuel electrode reaction catalyzing layer is 10-90 parts by weight.

8. The solid oxide fuel cell according to claim 1, wherein said lanthanum-gallate oxide is represented by a general formula $La_{1-a}A_aGa_{1-b-c}X_bZ_cO_3$ in which A is one or more kinds of Sr, Ca and Ba, X is one or more kinds of Mg, Al and In, Z is one or more kinds of Co, Fe, Ni and Cu, the value of a is $0<a<1$, the value of b is $0<b<1$ and the value of c is $0<c<0.15$.

9. The solid oxide fuel cell according to claim 1, wherein said lanthanum-gallate oxide is represented by a general formula $La_{1-a}Sr_aGa_{1-b-c}Mg_bCo_cO_3$ in which the value of a is $0.05 \leq a \leq 0.3$, the value of b is $0 \leq b \leq 0.3$ and the value of c is $0<c<0.15$.

10. A solid oxide fuel cell comprising a solid electrolyte layer between a fuel electrode and an air electrode, one of said fuel electrode and said air electrode functioning as a support, said solid electrolyte layer provided at least with a first layer and a second layer from the side of said support, said first layer comprising a cerium-containing oxide represented by a general formula $Ce_{1-x}Ln_xO_2$ in which Ln is one or more kinds of La, Pr, Nd, Sm, Eu, Gd, Tb, Dy, Ho, Er, Tm, Yb, Lu, Sc and Y and the value of x is $0.30<x<0.50$ and said second layer comprising a lanthanum-gallate oxide containing at least lanthanum and gallium, wherein said first layer contains a sintering assistant for improving sintering property of said cerium-containing oxide, wherein when the thickness of said second layer is T μm the value of T is $2<T<70$, wherein when the thickness of said second layer in said solid electrolyte layer is T μm, the value of T is $10 \leq T \leq 50$, and wherein said sintering assistant contained in said first layer contains Ga element or B element.

11. The solid oxide fuel cell according to claim 10, wherein said first layer is provided directly on said second layer.

12. The solid oxide fuel cell according to claim 10, wherein said first layer contains Ga element in an amount of X wt %, the value of X is $0<X \leq 5$.

13. The solid oxide fuel cell according to claim 10, wherein said first layer contains B element in an amount of Y wt %, the value of Y is $0<Y \leq 2$.

14. The solid oxide fuel cell according to claim 10, wherein when the thickness of said first layer is S μm, the value of S is $5<S<50$.

15. The solid oxide fuel cell according to claim 10, wherein in said cerium-containing oxide represented by the general formula $Ce_{1-x}Ln_xO_2$, Ln is La.

16. The solid oxide fuel cell according to claim 10, wherein between said fuel electrode and said solid electrolyte layer there is provided a fuel electrode reaction catalyzing layer comprising a uniform mixture between Ni and/or NiO and a cerium-containing oxide represented by $Ce_{1-y}Ln_yO_2$ in which Ln is one or more kinds of La, Pr, Nd, Sm, Eu, Gd, Tb, Dy, Ho, Er, Tm, Yb, Lu, Sc and Y, and the value of y is $0.05 \leq y \leq 0.50$, and wherein said cerium-containing oxide contained in said fuel electrode reaction catalyzing layer is 10-90 parts by weight.

17. The solid oxide fuel cell according to claim 10, wherein said lanthanum-gallate oxide is represented by a general formula $La_{1-a}A_aGa_{1-b-c}X_bZ_cO_3$ in which A is one or more kinds of Sr, Ca and Ba, X is one or more kinds of Mg, Al and In, Z is one or more kinds of Co, Fe, Ni and Cu, the value of a is $0<a<1$, the value of b is $0<b<1$ and the value of c is $0 \leq c \leq 0.15$.

* * * * *